May 10, 1955  Q. W. H. ROBB  2,708,124
FLUID PRESSURE ACTUATED GASKET
Filed Oct. 5, 1949
FIG. 1
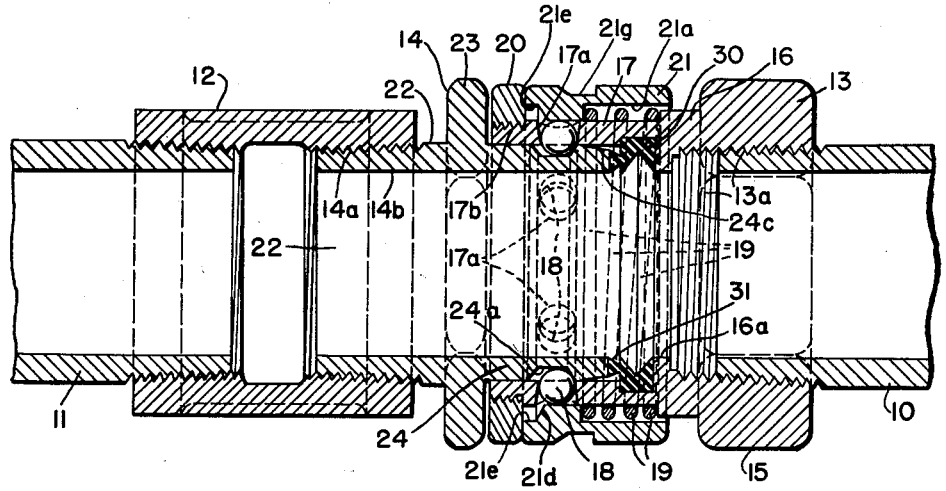
FIG. 2
FIG. 3
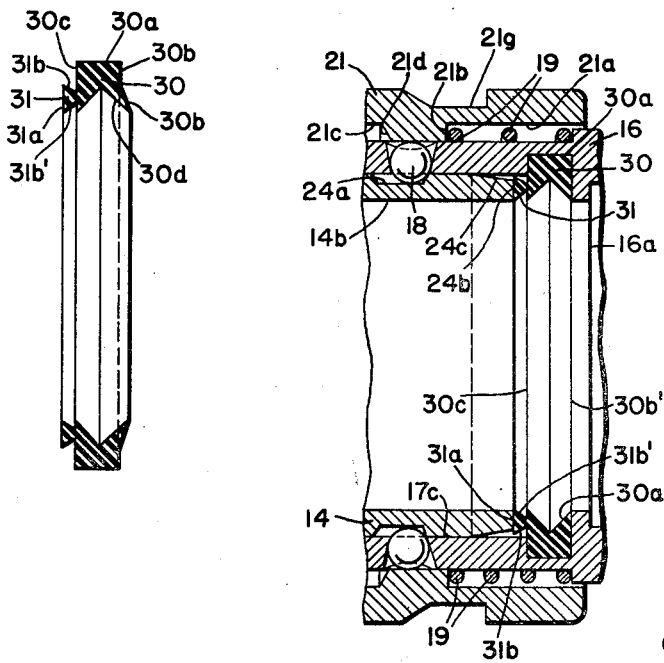
FIG. 4
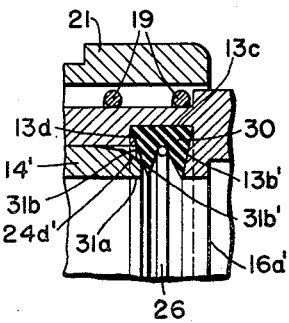
INVENTOR
QUENTIN W. H. ROBB
BY *Green, McCallister & Miller*
ATTORNEY tion of Pennsylvania

United States Patent Office 2,708,124
Patented May 10, 1955

2,708,124

FLUID PRESSURE ACTUATED GASKET

Quentin W. H. Robb, Pittsburgh, Pa., assignor to Robb Manufacturing Company, Pittsburgh, Pa., a corporation of Pennsylvania Application October 5, 1949, Serial No. 119,683

1 Claim. (Cl. 285—163)

This invention pertains to a gasket for fluid couplings. The gasket finds particular utility in a snap coupling of the type that will fully swivel about its immediately coupled parts without fluid leakage while it is being subjected to positive or negative fluid pressure, although its use is not limited thereto.

This application is a continuation-in-part of my application Serial No. 41,167 of July 28, 1948, now abandoned, entitled "Snap Coupling."

Snap couplings that have heretofore been known to those skilled in the art have had definite limitations as to their usage, due in a large measure to the ineffectiveness of existing gaskets for sealing off fluid flow between the coupling members. A peculiarity of couplings of this type is that they are impractical where negative pressures are encountered, allow a certain amount of leakage under positive pressures, and do not stand up under higher pressures. As a result, they have been utilized when requirements as to leakage have been relatively lax and where positive pressures of relatively low values are used. In general, they have been used where the fluid has a positive pressure somewhat corresponding to pressures encountered in domestic water pipes.

I determined from my investigations that a practical type of snap coupling could have a very wide field of usage and would solve problems arising in the coupling field that prior to my invention have been a major worry for those interested in conducting various types of fluids, and particularly liquids. I determined that a coupling to be successful would have to be positively leak-proof under all pressure conditions, would have to have a relatively long period of life in usage, would have to work successfully not only under various pressures but also under a vacuum. It should be capable of use where one part of the coupling is continuously swiveled or rotated while fluid is being carried. I first set out and determined that one of the most important factors which heretofore have limited the usage of a coupling of this type is the fact that an all purpose gasket has not been available. I then worked out a new and improved type of gasket for a snap type coupling based upon discoveries made. Thus, the coupling of my invention is believed to be the first so-called snap type of coupling which solves the problems herein mentioned and which thereby completely opens up the field of utilization of couplings of this type.

It has thus been an object of my invention to provide a new and improved form of gasket for use in fluid couplings;

Another object has been to provide a solution to the problem heretofore presented in the utilization of couplings of this type;

A further and more specific object has been to provide a gasket for use in a snap coupling of the type which is positive acting under all conditions of usage, is capable of free swivel (rotative) action about the adjacent surfaces of its connecting and sealing portions, and easily released when desired, and which gasket renders the snap type coupling leak-proof under all conditions of usage;

These and other objects of my invention will appear to those skilled in the art from the description of the illustrated embodiments of my invention.

Figure 1 is a sectional view in elevation taken longitudinally through a coupling in which the gasket of my invention is used and showing the coupling parts in a fully locked and sealed relationship;

Figure 2 is a somewhat enlarged side sectional view in elevation, showing the gasket of my invention;

Figure 3 is an enlarged side sectional fragmental view in elevation showing the coupling in its latched relationship and employing the gasket of Figure 2;

Figure 4 is a fragmental side sectional view in elevation showing a slightly modified construction of a coupling wherein one of the parts is provided with a sloped gasket-seating edge.

I determined that the gasket and its mounted relationship in the coupling is very important in carrying out my invention. An ordinary type of U- or V-shaped gasket has a cylindrical back face or wall which is at right angles to its perpendicular planar side walls; the side walls are cut out centrally to provide a U- or V-shaped chamber within the gasket. A resilient material, such as rubber, has a tendency to fatigue or lose a portion of its life under usage and as a result, the opposite side walls of a gasket of this type tend to curl or move inwardly towards the chamber therein and close it up. That is, the shape of the gasket of this type is such that retained forces tending to move its sides inwardly are greater than lost forces tending to hold them vertically or at substantially right angles to the back face or wall. Any tendency for the gasket to curl inwardly or move away from its adjacent seating surfaces will cause leakage and ultimate failure of the gasket. Thus, in accordance with my invention, I provide a basically U- or V-shaped gasket that has a seating heel portion of solid cross section as defined by its back wall or face and immediately adjacent portions of opposite side walls or faces thereof. Radially-inwardly beyond the immediately adjacent side wall portions that are substantially normal to the back wall, at least one of the side walls of V-shaped cross-section are shaped to normally flare or incline outwardly away from the V-shaped chamber defined thereby and therebetween. The flaring preferably begins slightly radially back of the bottom of the chamber within the gasket, or in other words, slightly back of a plane taken transversely across the gasket and parallel to the back wall of the gasket at the base or apex where the chamber terminates adjacent the solid heel of the gasket.

The female coupling part in which my gasket is illustrated and described has an integral portion or annular groove of rectangular cross-section therewithin that provides a permanent seat for the gasket. This portion extends unbrokenly about the back wall provided by the heel of the gasket, unbrokenly along the full radial extent of one side wall of the gasket, and unbrokenly along a portion of the radial extent of the opposite side wall of the gasket. This seating or gasket mounting portion has spaced-apart, opposed side walls that extend substantially at right angles to its back wall; its cross-sectional dimension substantially corresponds to the transverse dimension of the heel of the gasket. As a result, the fully abutting wall of the seating or mounting portion will distort or bend the adjacent outwardly-flared side wall of the gasket inwardly, so that it lies in a substantially vertical plane at right angles to the plane of its back wall. The unsupported portion of the opposite side wall of the gasket is thus free when it is positioned in the seating or mounting portion to pivot about its heel portion when an inner end or edge wall of the male part is moved longitudinally-axially into the female part, towards and into abutment with such side wall. The pivot action thus effected upon the opposite side wall of the gasket by the insertion of the male part of the coupling is enhanced by so positioning the gasket within the seating portion of the female part that the portion of the opposite side wall of the gasket that projects radially beyond the adjacent wall of the seating portion includes a portion of the gasket heel.

The side walls of a flared type of gasket constructed in accordance with my invention, unlike the conventional type of gasket previously mentioned, when the material begins to fatigue tend to move further outwardly away from the chamber defined thereby. As a result, the effective life of a gasket constructed in accordance with my invention extends beyond the normal fatigue life of the resilient rubber, plastic or fabric material employed, and there is little if any tendency for the side walls to curl or turn inwardly to close the pressure chamber.

As above intimated, it is important to so mount the gasket that at least three of its immediately adjacent sides are supported and that at least two of these sides are fully supported. Stated in a slightly different manner, the sides of the heel portion of the gasket must be substantially supported at all times. The side wall portion (referred to as part of the opposite side wall) of the heel may extend slightly, preferably not more than one third of its overall depth or radial dimension, beyond the adjacent seating wall. I prefer to employ a slight extension for this side wall portion beyond the recess wall, in order to further radial movement of its flared portion when the male part of the coupling is moved into a proper seating relationship with respect thereto.

My investigations have disclosed that in many fields of coupling utilization, a particular fluid line, such as a lubrication line for a rolling mill and similar equipment, is normally subjected to a positive pressure, but that it is the practice to periodically flush it out by a suction or negative pressure applied thereto. In other cases, such as in a refrigeration installation, the line will normally be subjected to negative pressure (suction or vacuum) and may be subjected to positive pressure for cleaning-out purposes. It is thus important to provide a coupling gasket that will not only be fully effective at low pressures and that will have a proportionate increase in sealing action as the line pressure increases, but that will be fully effective under negative pressure.

Since suction pressure is applied in a direction directly opposite to a positive pressure, it at first seemed impossible to design a gasket that would meet these requirements and that would be effective for both types of pressure. That is, there is a tendency for the gasket to be pulled inwardly under negative pressure, rather than pushed outwardly, as under positive pressure.

I have devised a gasket, however, which meets the aforementioned requisites and is particularly effective where high negative pressures are used. A gasket constructed in accordance with my invention has a seating heel portion of solid cross section as defined by its back wall or face and immediately adjacent portions of opposite side walls thereof. Radially-inwardly beyond the immediately adjacent side wall portions that are substantially normal to the back wall, one side wall flares or inclines outwardly away from the opposite side wall and the opposite side wall extends fully at substantially right angles to its back heel wall. Thus, a V-shaped chamber is defined between the two side walls. The opposite side wall is provided with a bellows-like integral, projecting rim or flange of somewhat triangular section. The rim is preferably spaced from the extreme main face of the opposite side wall of the gasket and diverges transversely outwardly therefrom as a bellows, so that it defines a radial-inner V-shaped pressure chamber and a radial-outer V-shaped pressure chamber with such opposite side wall. The inner V-shaped chamber is particularly effective when positive pressure is applied, while the outer V-shaped chamber is particularly effective when suction or negative pressure is applied.

In the arrangement of the male coupling part of Figure 4, I have provided its inner edge wall with a sloped surface upon which the integral rim extension of the gasket may rest or abut. The gasket is not dependent upon this type mounting seat for its effectiveness but is also effective when the inner edge wall of the male part is substantially at right angles to its longitudinal axis (see Figures 1 and 3).

The male part has a slightly chamfered or sloped top face adjacent its front edge wall to enable it to be more easily entered within the female part. The provision of the clearance about the top edge of the inner end of the male part does not adversely effect the sealing action of a gasket constructed, mounted and employed in accordance with my invention.

Referring particularly to the drawings, I have shown a pair of pipe or conduit members 10 and 11 connected together in a swiveled relationship by a snap type coupling for which my improved gasket was designed but it is to be understood that its use is not limited thereto. As shown in Figure 1, the conduit member 11 may be connected to a male part 14 of my coupling by a threaded connector 12. The male part or nipple 14 has male threads 14a on its outer end portion 22 for this purpose and has an inner peripheral wall surface 14b which has the same diameter as the pipe members 10 and 11. The extending end portion 22 is connected by an integral, radially-outwardly projecting flange portion 23 and is adapted to slide within an inner end portion 17 of the female part. An annular groove or race 24a is spaced from an inner front or edge wall 24b and from the flange portion 23 and extends about the outer periphery of the portion 24. The race 24a is defined by a radially-offset, back or bottom face of cylindrical shape and an opposite pair of spaced-apart or opposed side faces of conical shape that intersect it. The side faces of the recess 24a have an extending angular relationship with respect to the back face and diverge outwardly from the back face in such a manner as to provide tangential contact with spherical ball elements 18 that are carried by the female part 13. The ball elements 18 are adapted to be moved into a latching relationship with respect to the recess 24a when the male part 14 is fully inserted within the female part 13, as governed by the stop flange portion 23. The top inner edge 24c of the portion 24 of the male part 14 is preferably chamfered or slightly sloped off as shown, to aid in inserting the male part within the female part of the coupling unit.

The female part 13 has an outwardly-projecting wrench flat portion 15 at its outer end that is provided with internal threads 13a for securely connecting it to the pipe member 10. The wrench flat portion 13 is integrally connected by an annular portion 16 which is inwardly offset with respect to the portion 15 to slidably position an outer end portion of a latching sleeve 21. The portion 16 is integrally connected to an inner end portion 17 that has a smaller outer diameter than the portion 16 and defines a peripheral space with the sleeve 21 to receive a holding spring element 19. The inner diameter of the portion 17 substantially corresponds to the outer diameter of the portion 24 of the male part to slidably receive the latter. It will be noted that the threads 13a extend along the portion 16 and terminate at an inwardly-extending abutment rim 16a whose inner diameter corresponds to the inner diameter of the pipe members 10 and 11. It is thus apparent that a coupling unit of my invention has a minimum inner diameter along its full axial length at least corresponding to the inner diameter of the pipe members 10 and 11 which are to be connected.

The abutment rim 16a on its inner side provides an outer wall mounting for one side of the gasket 30, extends depthwise of the portion 17 of the female part 13, is of planar shape, and with a cylindrical back wall 13c (see Figure 4) and a spaced-apart opposite side wall 13d of lesser depth, defines a gasket-positioning, seating or mounting portion or recess within the female coupling part 13. It will be noted that the back wall 13c and the side walls 13b and 13d of the recess are of substantially rectangular cross-sectional shape.

A series of annularly-aligned, ball-carrying guide or receiving holes or slots 17a extend through the sleeve portion 17 of the female part and are located intermediate the portion 17. The inner end of the portion 17 is provided with external threads 17b to removably receive an outwardly-projecting positioning or limit flange or nut 20 thereon. The removable flange 20 of the female part 13 may cooperate with the integral flange 23 of the male part 14 to limit the extent of inward, telescoping movement of the male part with respect to the female part.

The sleeve latching and releasing member 21 has an inner wall portion 21a open to its outer end to slidably rest upon the portion 16 of the female part 13 and to receive a tension hold spring 19. The spring 19 is operably positioned at one end against an abutment edge 13e of the female part and at its other end against an inwardly-extending integral ledge portion 21b of the sleeve member 21 to normally urge the sleeve member inwardly towards the removable flange 20 of the female part. The abutment of an inner end wall of the sleeve member 21 with the removable flange 20 determines the maximum inward movement of the sleeve member along the outer periphery of the portion 17 of the female part. The inward, radially-extending ledge portion 21c of the sleeve member 21 is adapted to slide along the outer periphery of the portion 17. A recess is defined at the inner end of the sleeve member 21 by a pair of faces 21d (conical) and 21e (cylindrical), one of which is substantially horizontal or lies in a plane substantially parallel to the plane of movement to the sleeve member and the other of which is inclined and diverges radially-inwardly therefrom in a vertical direction. This recess receives the ball elements 18 when the member 21 is forced longitudinally-axially outwardly or backwardly against the tension of the spring element 19 and permits the ball elements 18 to move over the chamfered front edge of the race 24a of the male part to move radially-outwardly within their guide holes 17a and unlock the male part from the female part. The sleeve member also has an offset portion 21g centrally about its outer periphery to serve as a finger grip in effecting its sliding movement against the tension of the holding spring 19. When the latching sleeve member 21 is released, the ball elements 18 are then free to move into the race 24a when the male part 14 is inserted within the female part 13. The internal ledge portion 21c then holds the ball elements 18 in a latching relationship within the race 24a. The ball elements 18, the sleeve member 21, and the spring 19 may be removed by unscrewing the positioning flange 20 from the end of the female part 13. The abutment of the inner edge wall of the sleeve member 21 with the removable flange 20 as effected by the spring 19 is automatic and continues until the member 21 is moved longitudinally-axially outward to the right against the tension of the spring 19.

In Figure 2, I have shown an enlarged view of the gasket 30 which has a heel provided with a cylindrical back wall 30a and adjacent side wall portions 30b and 30c. It will be noted that the wall 30c is substantially normal to the wall 30a and has an integral ring-like projection or annulus 31 of triangular cross-sectional shape extending from its face. The annulus 31 has a substantially planar side (base) face 31a and a pair of inner and outer inclined or flared top and bottom faces 31b and 31b' which terminate in the face 31a and are connected at their inner ends apex to the wall 30c. The faces 31b and 31b' define additional pressure chambers with the side face 30c of the gasket, one of which is particularly effective and supplements the action of the chamber 30d when a positive fluid pressure is applied and the other of which is particularly effective when negative or suction pressure is applied. Figures 2 and 4 show the fully mounted position of the gasket 30 when the coupling unit is assembled.

In Figure 4, I have shown a slightly modified coupling construction wherein the inner end 24d' of the male part 14' has a conical surface which slopes backwardly to receive the face 31a of the gasket extension 31. In this type of arrangement, the male part 14' is adapted to move inwardly further than the normal male part 14 of Figure 12, so as to press the face 31a of the gasket towards its wall 30c and substantially close the inner chamber defined by the face 31b'. This arrangement is thus particularly suitable where the pipe line is to carry fluids under relatively high suction pressures in its utilization.

In the construction of Figure 4, the wall 13'b as well as the opposite wall 13'd of the gasket mounting recess are conical, but slope or converge radially-inwardly from the female part 13. As a result, the side walls of the gasket 30 which are normally flared outwardly are pressed inwardly beyond a plane normal to the back wall 13c, thereby increasing the holding action of the gasket in its mounting recess. This is particularly important under conditions of very high suction pressure, since such a type of pressure tends to move the flared or chamber-defining side walls of the gasket 30 radially-inwardly away from mounting recess of the female part 13. The circular expansion spring 26 aids in maintaining the chamber open and in retaining the heel portion of the gasket in its recess at all times.

The design of my gasket and the mounting thereof is such that it has a relatively long period of life beyond its normal fatigue life; it always provides a positive seal against any type of fluid pressure and any amount of such pressure.

What I claim is:

A resilient gasket of the character described for sealing-off fluid between a pair of interfitting inner and outer coupling parts without leakage under both positive and negative fluid pressure, wherein an outer part of the coupling has an annular recess within its inner periphery consisting of a base wall and a pair of opposed side walls and the side wall nearest the inner coupling part being of shortened extent, and the inner coupling part has an end wall positioned adjacent the shortened side wall of the recess; said gasket having a solid heel portion of substantially rectangular cross-section and a pair of opposed and spaced-apart side portions defining a radially-inwardly open chamber with said heel portion, one of said side portions flaring outwardly to be pressed inwardly by abutment with the other side wall of the recess, both of said side portions extending radially-inwardly from said heel portion, the other of said side portions to be positioned for abutment adjacent its base within the side wall of shortened extent and being substantially planar and extending radially-inwardly for its full extent at substantially right angles with respect to a base of said heel portion, an integral annular rim extending sideways-outwardly from the other of said side portions and having a triangular cross-sectional shape, an apex of said rim extending from the other of said side portions intermediate its radial inner and outer end portions and defining a pressure chamber with the radial inner end portion and a suction chamber within the radial outer end portion, and a wide base portion of said rim being positioned as a secondary side wall portion of said gasket to be pressed inwardly by abutment with the end wall of the inner coupling part.

References Cited in the file of this patent

UNITED STATES PATENTS

| 255,523 | Lightburne | Mar. 28, 1882 |
| 739,624 | Traver | Sept. 22, 1903 |
| 2,106,829 | Christenson | Feb. 1, 1938 |
| 2,322,877 | Parker | June 29, 1943 |
| 2,330,197 | Allen et al. | Sept. 28, 1943 |
| 2,366,161 | Tweedale | Jan. 2, 1945 |
| 2,377,812 | Scheiwer | June 5, 1945 |
| 2,413,978 | Krone et al. | Jan. 7, 1947 |
| 2,512,883 | Warren | June 27, 1950 |
| 2,512,999 | Bruning | June 27, 1950 |
| 2,568,516 | Scheiwer | Sept. 18, 1951 |